United States Patent [19]

Kataoka et al.

[11] Patent Number: 4,788,679
[45] Date of Patent: Nov. 29, 1988

[54] PACKET SWITCH WITH VARIABLE DATA TRANSFER RATE LINKS

[75] Inventors: Hideki Kataoka, Tokorozawa; Tatsuro Takahashi, Tokyo; Shiro Kikuchi, Mitaka; Naoaki Yamanaka, Yokohama; Hajime Sakakibara, Musashino; Miki Hirano, Tokyo, all of Japan

[73] Assignee: Nippon Telegraph and Telephone Corporation, Tokyo, Japan

[21] Appl. No.: 83,646

[22] Filed: Aug. 10, 1987

[30] Foreign Application Priority Data

Sep. 2, 1986 [JP] Japan .................................. 61-206140
Sep. 3, 1986 [JP] Japan .................................. 61-206966

[51] Int. Cl.$^4$ .............................................. H04J 3/26
[52] U.S. Cl. .......................................... 370/60; 370/84
[58] Field of Search ...................... 370/60, 66, 67, 84, 370/94, 58

[56] References Cited

U.S. PATENT DOCUMENTS

| 3,796,835 | 3/1974 | Closs et al. | 370/94 |
| 3,987,251 | 10/1976 | Texier et al. | 370/84 |
| 4,071,701 | 1/1978 | Leijonhufvud et al. | 370/66 |
| 4,630,260 | 12/1986 | Toy et al. | 370/94 |
| 4,703,478 | 10/1987 | Haselton et al. | 370/94 |

Primary Examiner—Robert L. Griffin
Assistant Examiner—Melvin Marcelo
Attorney, Agent, or Firm—Staas & Halsey

[57] ABSTRACT

A packet switch has pluralities of incoming and outgoing trunks, a data memory accessible from them in common, and FIFO memories each provided in each of input and output circuits. Data from the incoming trunks is written into and read out from the buffer memory for transfer to the outgoing trunks, on a time-shared basis, to perform packet switching between trunks of different data transfer rates. Furthermore, the packet switch has an arbiter for detecting process requests from the input circuits and an arbiter for detecting process requests from the output circuits, so that priority control is effected for servicing the requests. As a result, dynamic allocation of access to the buffer memory to the input and output circuits is permitted.

4 Claims, 13 Drawing Sheets

F I G. 3
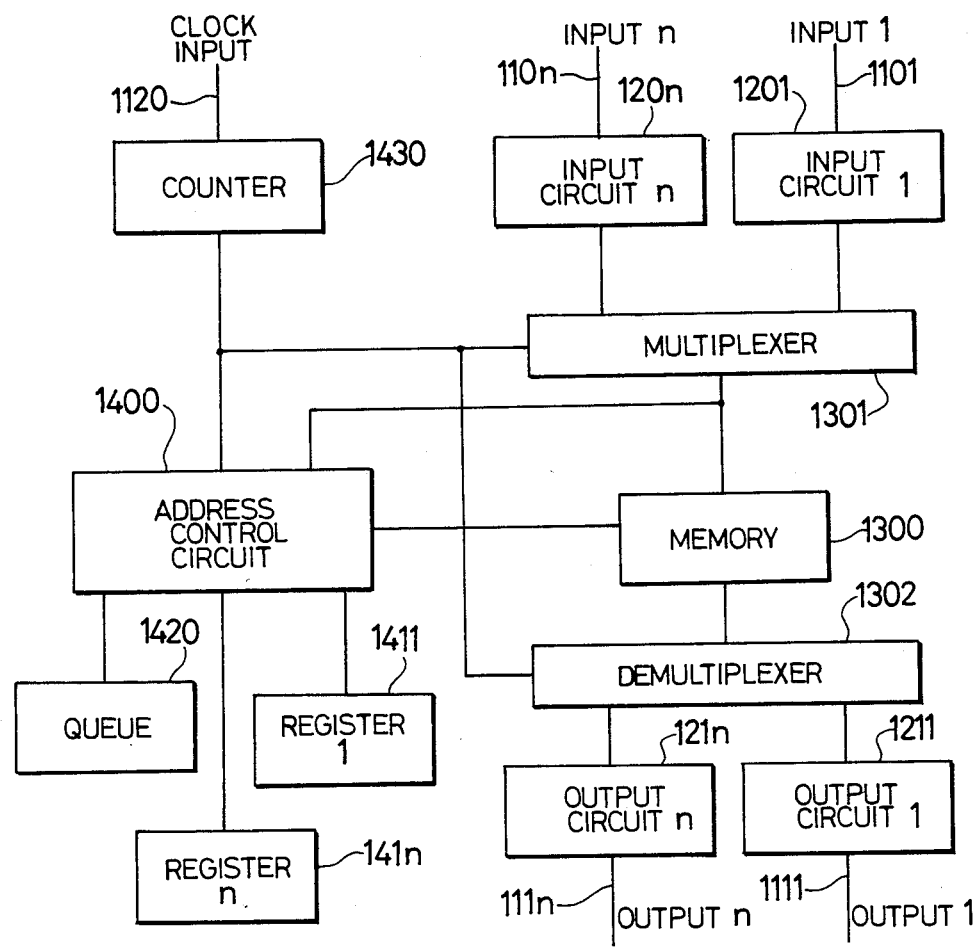

FIG. 5

|  | TRUNK 1 | TRUNK 2 | TRUNK n |
|---|---|---|---|
| INPUT | TRUNK STATE | TRUNK STATE | TRUNK STATE |
| | BUFFER NUMBER | BUFFER NUMBER | BUFFER NUMBER |
| | ADDRESS IN BUFFER | ADDRESS IN BUFFER | ADDRESS IN BUFFER |
| OUTPUT | TRUNK STATE | TRUNK STATE | TRUNK STATE |
| | BUFFER NUMBER | BUFFER NUMBER | BUFFER NUMBER |
| | ADDRESS IN BUFFER | ADDRESS IN BUFFER | ADDRESS IN BUFFER |
| | QUEUED PACKET | QUEUED PACKET | QUEUED PACKET |
| | BUFFER NUMBER | BUFFER NUMBER | BUFFER NUMBER |

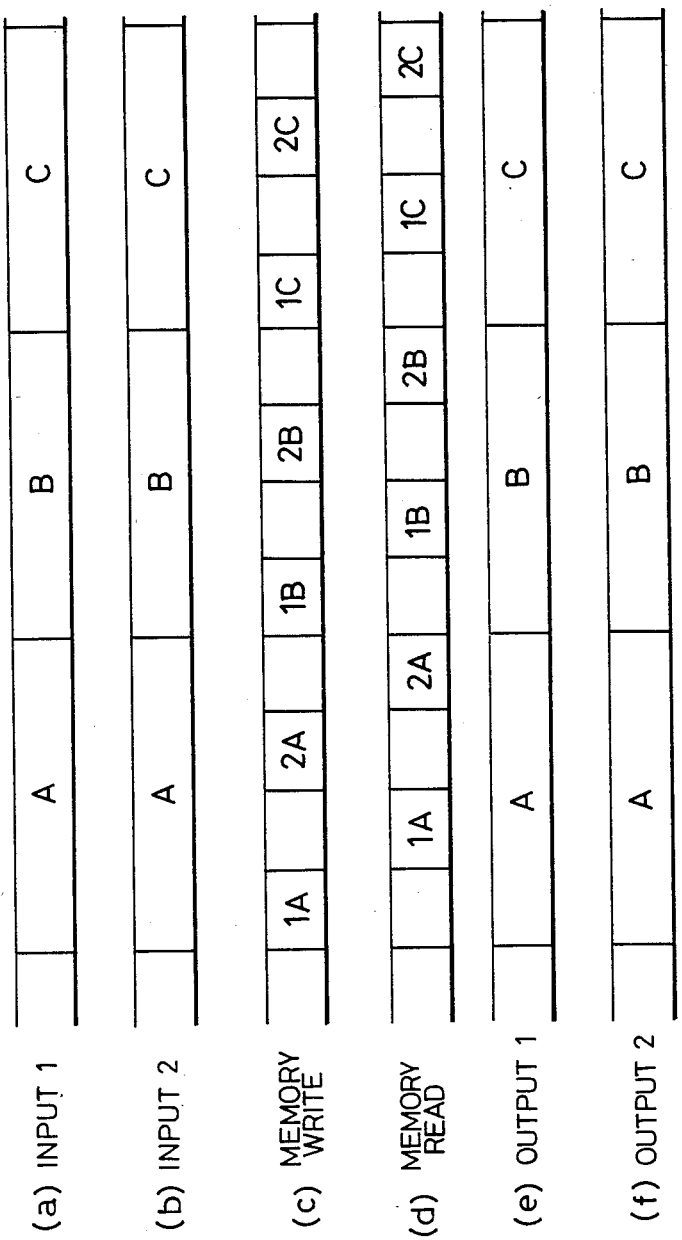

FIG. 8

(a) INPUT 1 | A | B | C (b) INPUT 2 | A | B | C (c) MEMORY WRITE | 1A | 2A | 1B | 2B | (1) | 2C ( ) ····· WASTED ACCESS CYCLE

FIG. 10

(a) INPUT 1 | A | B | C (b) INPUT 2 | A | B | C (c) MEMORY WRITE | 1A | 2A | 1B | 2B | 2C | 1C

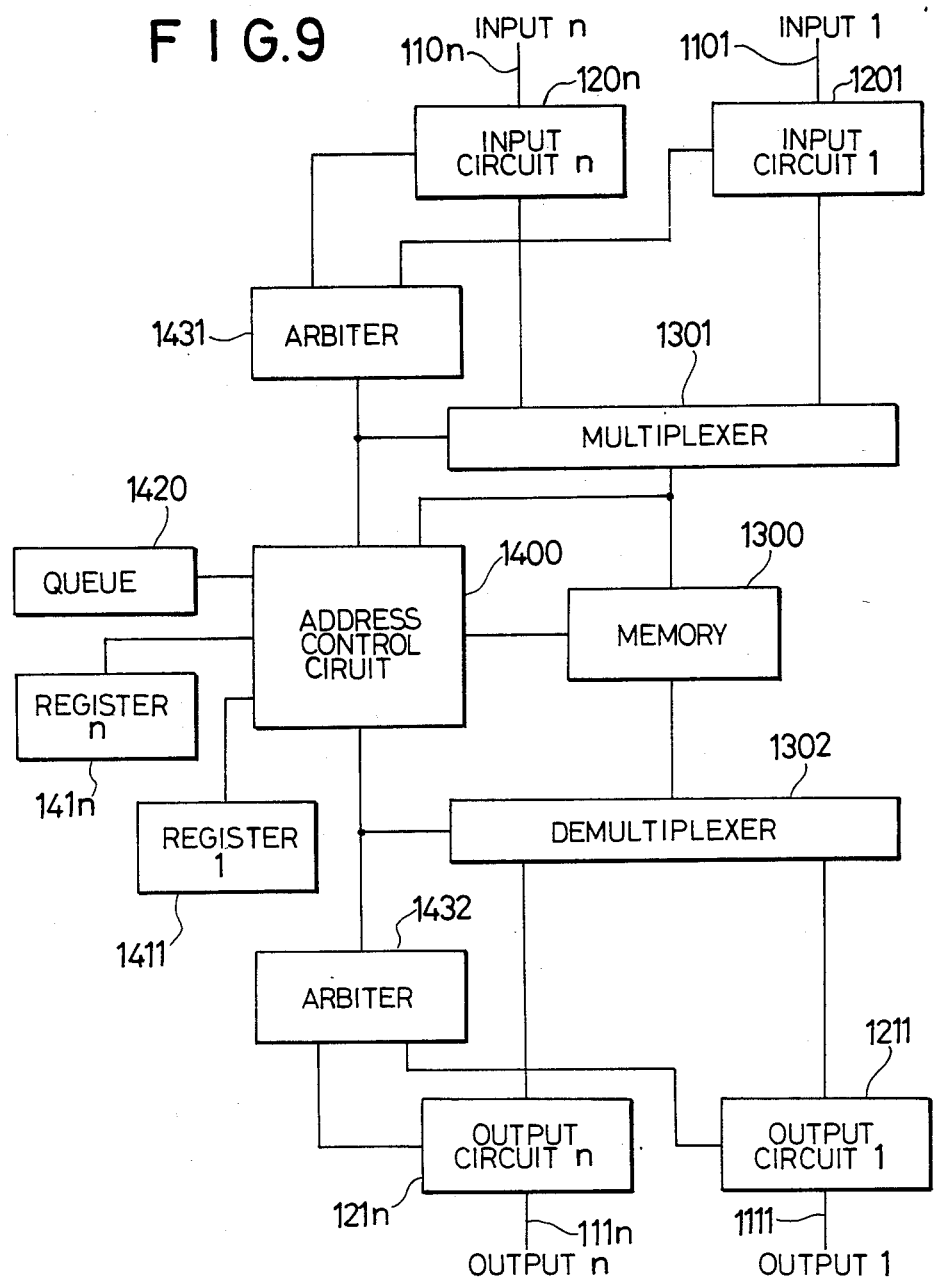

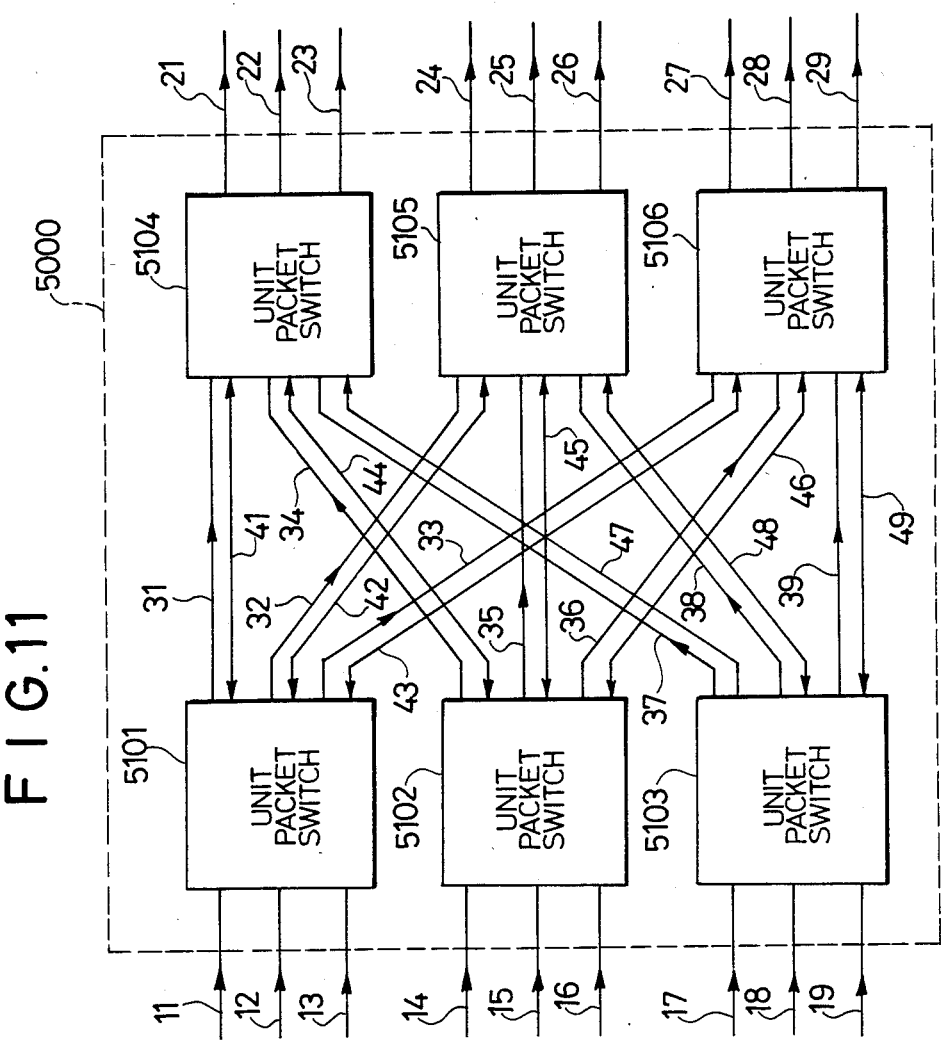
F I G. 11

PACKET SWITCH WITH VARIABLE DATA TRANSFER RATE LINKS

BACKGROUND OF THE INVENTION

1. Field of the Invention

The present invention relates to a packet switch for use in a packet switching system or the like which switches packetized information and, more particularly, to a large capacity packet switch which permits the accommodation of a number of high-speed trunks in the packet switching system.

2. Description of the Prior Art

Conventionally known as a packet switch is a bus matrix switch, which has such an arrangement as shown in FIG. 1.

In FIG. 1 input packets transmitted over trunks 101 to 10n are subjected to predetermined processing in received packet processing equipment 301 to 30n, by which the received packets are each added with a packet header specifying any one of transmitted packet processing equipment 311 to 31n, thereafter being provided on that one of column buses 201 through 20n which is connected to the specified transmitted packet processing equipment. At intersections of the column buses 201 to 20n with row buses 211 to 21n there are provided cross point elements (XE) 411 to 4nn. The cross point element 4ij acquires only the packet whose header has a destination j, that is, the packet destined for the transmitted packet processing equipment 31j, and the acquired packet is temporarily stored in a buffer 400 depicted in FIG. 2.

Having stored the packet in the buffer 400, the cross point element 4ij sends to the row bus 21j a use-of-bus request for transmission of the packet. The request is detected and controlled by one of bus control circuits 321 to 32n for each row bus and access permission is given to only one cross point element 4ij, after which the packet is sent out.

FIG. 2 illustrates the arrangement of the cross point element 4ij. The headers of the packets received from the column bus 20i are checked for their destination by a control circuit 401 and only those destined for the row bus 21j are loaded into the buffer 400. The buffer 400 is what is called a FIFO (First-In First-Out) memory which outputs data in the order of input. The row bus 21j includes a data bus 21j−1 which transmits packets and a control bus 21j−2 which transmits control signals for request and permission.

According to the prior art described above, however, a bus matrix switch with n inputs and n outputs calls for $n^2$ cross point elements. On this account, the prior art is disadvantageous economically in that an increase in the number n will cause a marked increase in the number of cross point elements needed.

SUMMARY OF THE INVENTION

It is therefore an object of the present invention to provide a high-speed, large-capacity, low-cost packet switch.

Another object of the present invention is to provide a packet switch which makes good use of the storage capacity and operation speed of a buffer memory and attains high throughput with a small amount of hardware used.

With a view to obviating the above-mentioned defect of the prior art, the packet switch of the present invention is provided with pluralities of incoming trunks and outgoing trunks and brings data of the respective incoming trunks into and out of a single memory for transfer to the outgoing trunks, on a time division multiplex basis, so that a buffer provided on the memory is shared among the respective trunks.

According to the above arrangement, packetized data received from the plurality of incoming trunks is written into the single memory on the time division multiplex basis. The data thus stored in the memory is read out therefrom on the time division multiplex basis and is each provided on a desired outgoing trunk. Accordingly, it is possible to obtain a low-cost, large-capacity packet switch which is capable of sharing a single memory among incoming and outgoing trunks.

BRIEF DESCRIPTION OF THE DRAWINGS

FIG. 3 is a block diagram illustrating the arrangement of a first embodiment of the present invention;

FIG. 5 is a conceptual diagram showing the arrangements of registers 1411 through 141n in the first embodiment;

FIG. 6 is a timing chart for explaining the operation of the first embodiment;

FIG. 8 is a timing chart for explaining the operation of the second embodiment;

FIG. 9 is a block diagram illustrating the arrangement of a third embodiment of the present invention;

FIG. 10 is a timing chart for explaining the operation of the third embodiment;

FIG. 11 is a block diagram illustrating the arrangement of a fourth embodiment of the present invention;

DESCRIPTION OF THE PREFERRED EMBODIMENTS

FIG. 3 illustrates in block form the arrangement of the packet switch according to a first embodiment of the present invention. Packetized data received from incoming trunks 1101 through 110n is supplied to input circuits 1201 through 120n. The outputs from the input circuits 1201 through 120n are all provided to a multiplexer 1301. The multiplexer 1301 selects one of the n input circuits 1201 through 120n. Data of the selected input circuit 120i is written into a memory 1300 which is formed by a RAM.

Figure 1:
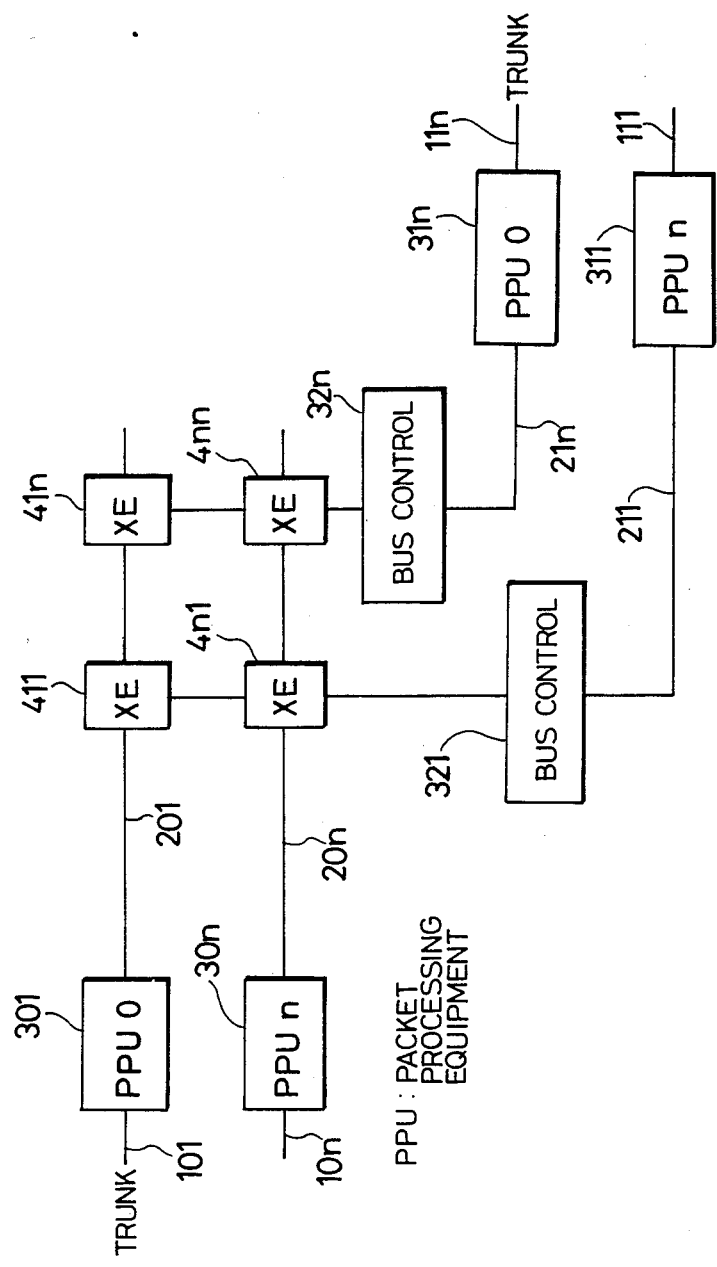
FIG. 1 is a block diagram showing the arrangement of a conventional bus matrix switch.
Figure 2:
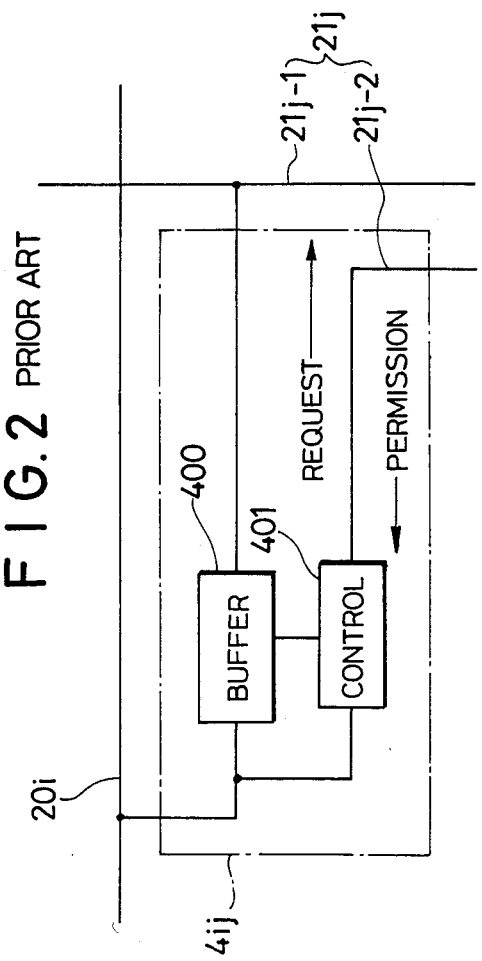
FIG. 2 is a block diagram showing the arrangement of a cross point element for use in the bus matrix switch depicted in FIG. 1.
Figure 4:
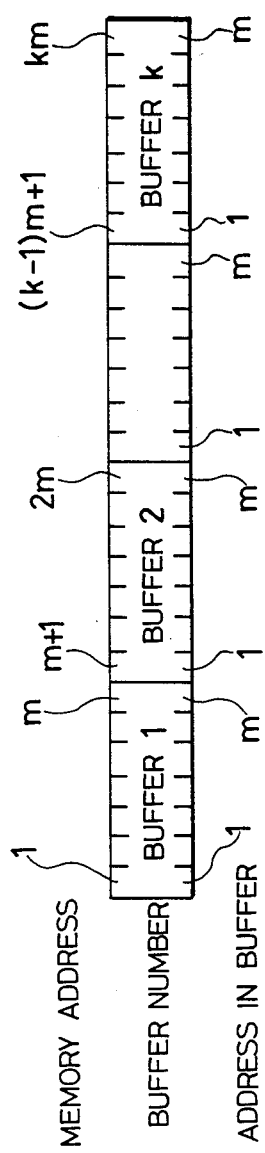
FIG. 4 is a conceptual diagram showing the relationship between buffers and memory addresses in a memory 1300 used in the first embodiment.

On the other hand, packetized data in the memory 1300 is read out via a demultiplexer 1302 into any one of n output circuits 1211 through 121n, from which it is provided on that one of outgoing trunks 111l through 111n which is connected to the output circuit. As shown in FIG. 4, the memory 1300 has k buffers, each having a length m and an address in the memory 1300 is determined by a buffer number and an intra-buffer address.

The memory 1300 has connected thereto an address control circuit 1400, to which are connected n registers 1411 through 141n, a queue 1420, and a counter 1430.

The registers 1411 to 141n have such an arrangement as depicted in FIG. 5. The registers 1411 to 141n correspond to the n incoming and outgoing trunks 1101 to 110n and 1111 to 111n, respectively, and control incoming and outgoing sides separately. That is, the registers 1411 to 141n have each stored therein the trunk state, the buffer number, and the intra-buffer address for one of the incoming trunks 1101 to 110n and the trunk state, the buffer number, the intra-buffer address, and the buffer address of a queued packet for one of the outgoing trunks 1111 to 111n.

The queue 1420 stores a queue for controlling blank buffers. The counter 1430 counts and frequency divides clock pulses 1120 and causes the address control circuit 1400 to perform address counting.

Next, a description will be given of the operation of this embodiment.

(I) Write Operation of Memory 1300

(1) Input data is provided to the address control circuit 1400 via the input circuit 120i and the multiplexer 1301.

(2) The address control circuit 1400 monitors the packet header of the input data to decide the presence or absence of the packet and its destination.

(3) Upon receiving the head of the packet, the address control circuit 1400 renders the trunk state in the register 141i corresponding to the incoming trunk concerned "receiving".

(4) The address control circuit 1400 reads out blank buffers from the queue 1420 and acquires one of them for assignment to the received packet.

(5) Upon receiving the head of the packet, the address control circuit 1400 makes the intra-buffer address a "0" and defermines the intra-buffer address on the bases of the "0" intra-buffer address and the buffer number of the acquired buffer.

(6) The address control circuit 1400 writes the packetized data in the acquired buffer.

(7) At the same time, the address control circuit 1400 increments the intra-buffer address by one and writes it in the register 141i of the trunk concerned, along with the buffer number.

(8) The address control circuit 1400 reads the destination of the packet from the packet header and writes the buffer number of the acquired buffer in a waiting packet storage area of the register 141i corresponding to the outgoing trunk 111i for which the packetized data is destined.

(9) During packet reception, the address control circuit 1400 reads out the buffer number and the intra-buffer address from the register 141i, determines a write address in the memory 1300, and places the data into the address. Furthermore, the address control circuit 1400 increments the intra-buffer address and writes it into the register 141i.

(10) Upon receiving the end of the packetized data, the address control circuit 1400 writes the data into the memory 1300 and, at the same time, renders the trunk state in the register 141i "empty".

When the packet receiving operation has thus been completed, the packet transmitting operation is started immediately.

(II) Readout Operation of Memory 1300

(1) At the start of the packet transmitting operation the address control circuit 1400 reads the register 141i of the trunk concerned in search for a queued packet. When a queued packet is detected, the address control circuit 1400 reads out data from a memory address which is specified by the buffer number in which the queued packet is stored and its intra-buffer address "0".

(2) The address control circuit 1400 provides the readout data via the demultiplexer 1302 to the output circuit 121j, from which it is sent over the outgoing trunk 111j.

(3) The address control circuit 1400 increments the intra-buffer address by one, and it makes the outgoing trunk state in the register 141j "transmitting" and then writes the above-mentioned buffer number into the register 141j.

(4) During packet transmission the address control circuit 1400 reads out the outgoing trunk state in the register 141j. When the outgoing trunk state is "transmitting", the address control circuit 1400 reads out data from the memory address that is specified by the buffer number and intra-buffer address stored in the register 141j, and provides the data via the demultiplexer 1302 to the output circuit 121j, from which it is provided on the outgoing trunk 111j.

(5) At the same time, the address control circuit 1400 increments the intra-buffer address and stores it in the register 141j.

(6) When sending out the end of the packet, the address control circuit sends out the data in the same manner as referred to above in step (4). Then, in order to clear the buffer used for sending out the packet, the address control circuit 1400 writes its buffer number in the queue 1420.

The write and readout operations for the memory 1300 take place alternately with each other as depicted in FIG. 6. FIG. 6 shows the case where two trunks are employed, and the write and read operations are carried out in a repeating cyclic order (write for trunk 1 - readout for trunk 1 - write for trunk 2 - readout for trunk 2). Also in the case where the number of trunks used is n, data in the trunks 1 to n is similarly brought into and out of the memory 1300 on a time-shared basis.

With the above-described operation it is possible to form a packet switch which employs a RAM as a buffer. This buffer can be shared by n incoming and outgoing trunks 1101 to 110n and 1111 to 111n.

While in the above one packet is described to be stored in one buffer, one long packet can also be stored using n buffers. Moreover, data with m bits in parallel 1 can also be written into and read out of the memory by making provision for effecting a serial-to-parallel transformation and a parallel-to-serial transformation in the input and output circuits 1201 to 120n and 1211 to 121n.

Figure 7:
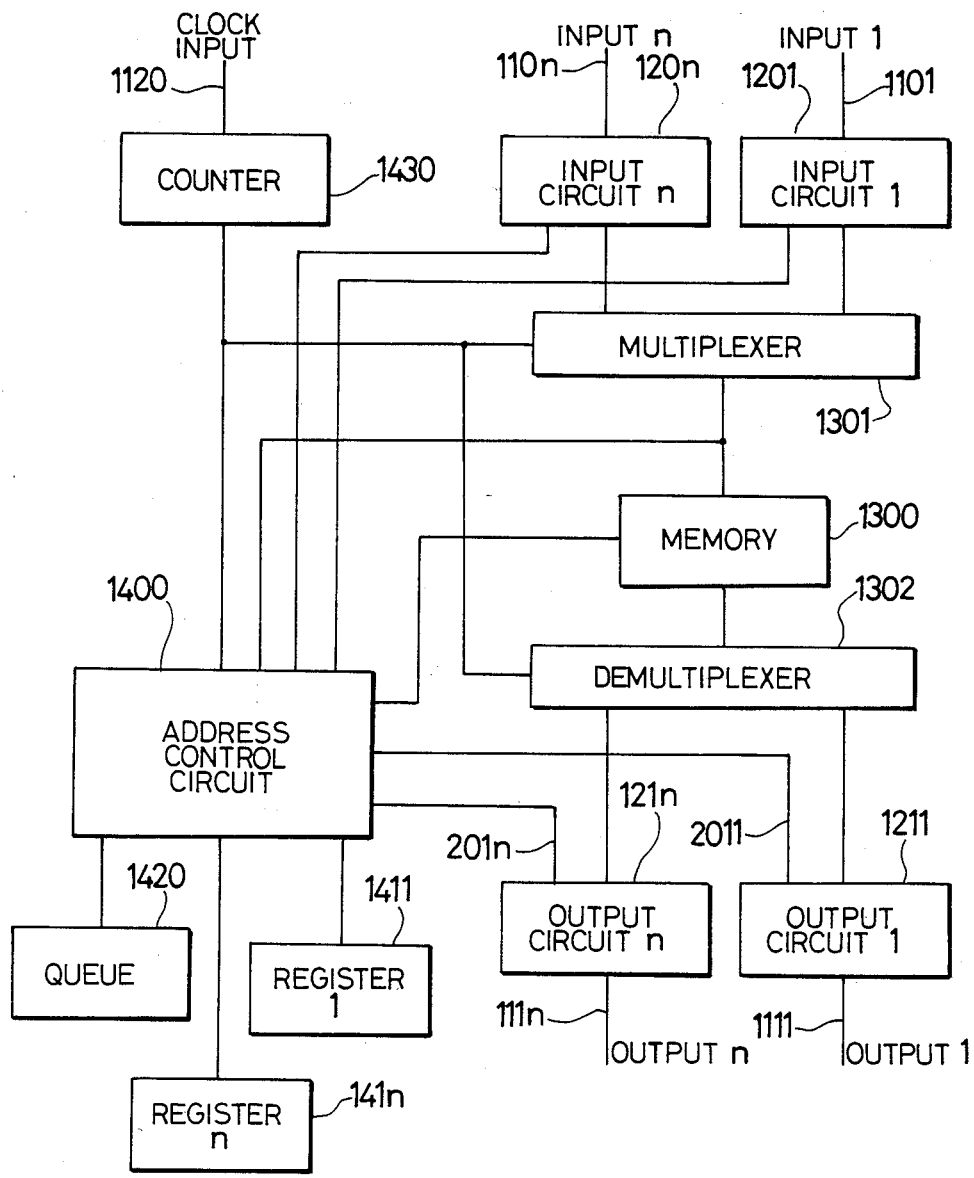
FIG. 7 is a block diagram illustrating the arrangement of a second embodiment of the present invention.

FIG. 7 illustrates in block form the arrangement of a packet switch according to a second embodiment of the present invention.

The packet switch of this embodiment has, in addition to the arrangement of the packet switch of the first embodiment shown in FIG. 3, (1) rate-adaptation FIFO memory in each of the input circuits 1201 to 120n and each of the output circuits 1211 to 121n, and (2) signal lines 2001 to 200n and 2011 to 201n for information indicating whether data transmission and reception is possible or not, between the input circuits 1201 to 120n and the address control circuit 1400 and between the output circuits 1200 to 121n and the address control circuit 1400.

FIG. 8 shows the operation of the second embodiment. In FIG. 8 the incoming trunks 1 and 2 differ in transmission rate, and the former is lower than the latter. The write into the memory 1300 alternates between the incoming trunks 1 and 2, and the cycle therefor is equal to the input cycle of the trunk 2 of the higher rate. Consequently, in the case of the trunk 1 of the lower rate, a wasted access cycle may sometimes occur as indicated by (1) between the writes 2B and 2C in FIG. 8(C), owing to the absence of data 1C to be written during the access to the memory 1300.

Accordingly, the address control circuit 1400 needs to recognize whether the data to be placed into the memory 1300 has arrived at the FIFOs of the input circuits 1201 to 120n. The signal lines 2001 to 200n are provided for this purpose. That is to say, the address control circuit 1400 checks the signal lines 2001 to 200n for the presence of data and, when the data is present, writes it into the memory 1300 in the same fashion as in the first embodiment. When no data is present, the address control circuit 1400 neither effects a write in the memory 1300 nor updates the register 141j.

This applies to the readout side. It is indicated by the signal lines 2011 to 201n to the address control circuit 1400 whether the FIFO of the output circuit 121j is able to receive data. Based on the information thus transmitted thereto, the address control circuit 1400 decides whether to read out data from the memory 1300 for input to the output circuit 121j. That is, when the FIFOs of the output circuits 1211 to 121n are empty and data transmission is possible, the address control circuit 1400 reads out data from the memory 1300 in the same manner as in the first embodiment, whereas when the data transmission is impossible, the address control circuit 1400 neither reads out data from the memory 1300 nor updates the register 141j.

Incidentally, the write/read rate V0 for the memory 1300 needs to bear the following relationship to the data rate Vi (where i=1, 2, ... n) of the incoming and outgoing trunks.

$$V0 \geq n \times max\ (Vi)$$

The second embodiment described above permits packet switching between trunks of different rates. In other words, an economical packet switch can be obtained without the necessity of using rate-adaptation equipment.

FIG. 9 illustrates in block form the arrangement of a packet switch according to a third embodiment of the present invention. This embodiment features dynamic allocation of the access to the memory 1300 to each trunk. To this end, (1) an arbiter 1431 is interposed between the input circuits 1201 to 120n and the address control circuit 1400, for detecting process requests from the input circuits 1201 through 120n and determining the sequence in which they are serviced, and (2) an arbiter 1432 is interposed between the output circuits 1211 to 121n and the address control circuit 1400, for detecting process requests from the output circuits 1211 through 121n and performing priority processing.

This embodiment is common to the second embodiment in that the input circuits 1201 to 120n and the output circuits 1211 to 121n each have a FIFO.

FIG. 10 shows the timing of access to the memory 1300 in this third embodiment. As depicted in FIG. 10, writes are effected in the memory 1300 in the order of generation of the inputs. It is necessary that the following relationship be established between the write/read rate V0 and the data rate Vi (where i=1, 2, ... n) of the incoming and outgoing trunks.

$$V0 \geq V1 + V2 + \ldots + Vn$$

According to the third embodiment described above, packet switching can be achieved between trunks of different rates, and furthermore, since no access cycle is wasted in the access to the memory 1300 as in the second embodimet, the operation speed of the memory can be reduced, or when the access speed is fixed, trunks of higher speed can be accommodated.

Although the above embodiments have been described in connection with the case where the packet switch structure is formed using a single packet switch as a unit switch, it is also possible, with the present invention, to constitute a packet switch assembly by a multi-stage connection of a plurality of unit packet switches connected through links.

Next, a description will be given of an example of the packet switch assembly of the present invention which is formed by a multi-stage connection of a plurality of unit switches which are identical with those described previously with respect to the first to third embodiments. The packet switch assembly comprises a multi-stage connection of such unit switches, each of which has one or more packet input terminals, one or more output packet output terminals, and a buffer memory accessible from the input terminals and the output terminals in common to them and having a capacity large enough to store a plurality of packets and which brings data in and out of the buffer memory in response to a request to write into the buffer memory from the input terminals and a request to read out of the buffer memory to the output terminals. The respective stages of unit packet switches are connected by means of links which perform asynchronous packetized data transfer operations through utilization of a handshaking technique. A control circuit controls the data transfer while dynamically changing the capacity of each of the links accommodated in each unit packet switch, within a range in which the sum of the data transfer rates of the links is lower that the operation speed of the buffer memory in the unit packet switch.

With the above arrangement, the data transfer rate of each of the packetized data transfer links accommodated in each unit packet switch can be changed dynamically within the range in which the sum of the data transfer rates of the links is held below the operation speed of the buffer memory used in the unit packet switch. This makes it possible to raise the data transfer rate of that one of the links of each unit packet switch which has a particularly increased traffic volume and to reduce the data transfer rate of the other links, thereby permitting an efficient data transfer.

Figure 12:
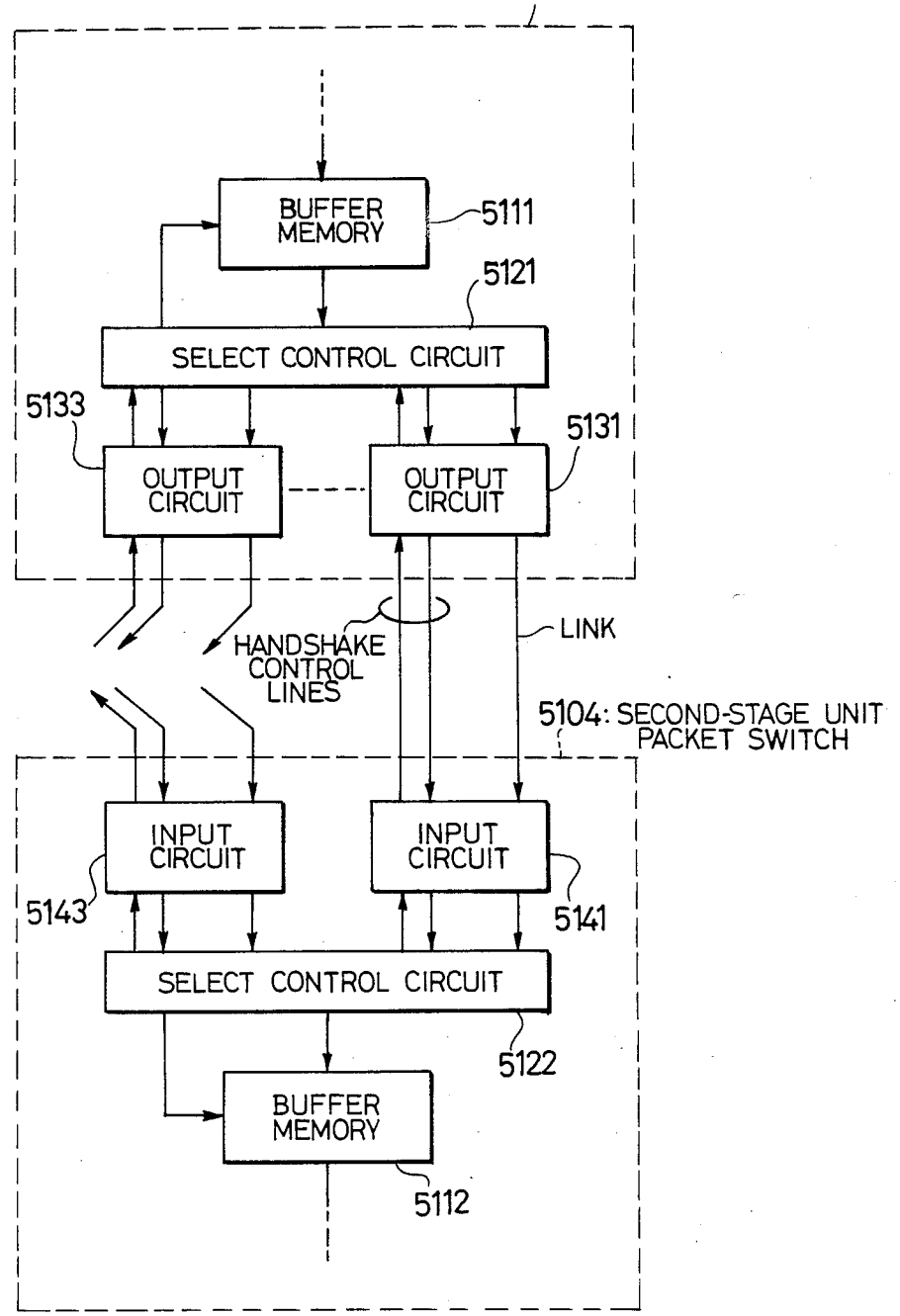
FIG. 12 is a block diagram showing the arrangement of the principal part of a unit packet switch in the fourth embodiment.

FIGS. 11 and 12 both illustrate in block form the arrangement of a packet switch assembly according to a fourth embodiment of the present invention in which triads of unit switches are arranged in two columns. In FIGS. 11 and 12 reference numerals 5101 to 5106 indicate unit packet switches, 5000 a packet switch assembly comprising two stages of unit packet switches, 11 to 19 incoming trunks of the packet switch assembly 5000, 21 to 29 outgoing trunks of the packet switch assembly 5000, 31 to 39 links, and 41 to 49 control lines for performing data transfers through the links 31 to 39 by utilization of the handshaking technique.

FIG. 12 shows the internal structures of the first-and second-stage unit packet switches 5101 and 5104. The other unit packet switches are also identical in construction with them. In this embodiment the packet switch of the third embodiment is employed as each unit packet switch.

The first-stage packet switch 5101 comprises a buffer memory 5111 for storing received packetized data, output circuits 5131 to 5133 for sending out data onto the links 31 to 33, and a select control circuit 5121. The output circuits 5131 to 5133 each send a packetized data readout request to the select control circuit 5121 in the case where the packetized data to be read into the output circuit is stored in the buffer memory 5111 and packetized data previously read into the output circuit has already been sent out therefrom and onto any one of the links 31 to 33. The select control circuit 5121 performs the arbitration (contention resolution and selection of apecific output port) of the readout requests from the output circuits 5131 to 5133, by which it selects the requests in a sequential order and reads out and into the output circuits 5131 to 5133 the data corresponding to the selected requests therefrom, respectively. The select control circuit 5121 corresponds to the demultiplexer 1302, the arbiter 1432, and the address control circuit 1400 in FIG. 9.

The second-stage packet switch 5104 comprises a buffer memory 5112, a select control circuit 5122, and input circuits 5141 to 5143. The input circuits 5141 to 5143 each send a write request to the select control circuit 5122 upon reception of packetized data from any one of the links 31, 34 and 37. The select control circuit 5122 corresponds to the multiplexer 1301, the arbiter 1431, and the address control circuit 1400 in FIG. 9. The select control circuit 5122 performs the arbitration of the write requests from the input circuits 5141 to 5143, selects the input circuits 5141 to 5143 in a sequential order, and writes the received data into the buffer memory 5112 on a time-shared basis.

In such an arrangement, packetized data having arrived at the incoming trunks 11 to 13 is expanded to parallel pieces of data each equal to the word length of the buffer memory 5111 and then written thereinto word by word. For example, when one packet is 2048 bits long and one word is 32 bits long, data of one packet will be written into the buffer memory 5111 in 64 steps.

When the packetized data has been written into the buffer memory 5111, storage information is loaded as a queue in that one of the links 31 to 32 corresponding to the outgoing trunk on which the data is to be sent out, according to routing information in the packet header of the packetized data. When the specified one of the links 31 to 33 becomes empty, the packetized data is separated again into pieces of data each equal in length to the word length of the buffer memory 5111 and read out therefrom, thereafter being transferred to the second-stage unit packet switches 5104 to 5106. The above-mentioned queue is placed under control of a control section (not shown) in the unit packet switch 5101.

The above-described write and readout operations for the buffer memory 5111 are time-shared by the incoming trunks 11 to 19 and the links 31 to 39. In this instance, since the incoming trunks 11 to 19 are of the same fixed rate, the write therefrom is effected periodically. However, by providing small-capacity FIFOs for packetized data in a one-to-one correspondence with the incoming trunks 11 to 19, a certain degree of freedom can be allowed in the write from the incoming trunks 11 to 19 into the buffer memory 5111.

On the other hand, since the data transfer over the links 31 to 39 is based on the asynchronous handshaking system, the readout operations from the buffer memory 5111 to the links 31 to 39 become asynchronous.

In this way, the packetized data is transferred from the first-stage unit packet switches 5101 to 5103 to the second-stage ones 5104 to 5106 and are temporarily stored in the buffer memories 5112 of the latter, thereafter being provided on the outgoing trunks 21 to 29 at a fixed rate.

The data transfer rate by the handshaking technique is dependent upon the read cycle time for reading out transmission data from the buffer memory 5111, the write cycle time for writing the received data into the buffer memory 5111, and the operation time of a circuit which transfers the packetized data and control information. The transfer circuit is usually formed by a simple circuit such as a flip-flop, gate, or the like, and operates at a speed sufficiently higher than the operation speed of the buffer memory 5111. Therefore, the data transfer rate is determined mainly by the operation speed of the buffer memory 5111.

For example, in the case where packetized data to be sent from the unit packet switch 5101 to the unit packet switch 5104 is not stored in the buffer memory 5111 of the former, or where the buffer memory 5112 of the unit packet switch 5104 is full and accordingly new packetized data cannot be written thereinto, the data transfer rate on the link 31 becomes zero since the operation speed of the buffer memory 5111 or 5112 is zero.

On the other hand, where the unit packet switch 5101 does not have any data to be sent to the unit packet switches 5105 and 5106 nor do the unit packet switches 5102 and 5103 have any data to be sent to the unit packet switch 5104, the output circuits 5132 and 5133 corresponding to the links 32 and 33 do not make the readout request in the unit packet switch 5101 and the input circuits 5142 and 5143 corresponding to the links 34 and 37 do not make the write request in the unit packet switch 5104. Accordingly, the packetized data transfer from the unit packet switch 5101 to the unit packet switch 5104 can be achieved at a higher rate than in the cases of effecting reads into a plurality of links and writes from a plurality of links. The reason for this is that, in this instance, since the output circuit 5131 and the input circuit 5141 can occupy the buffer memories 5111 and 5112, respectively, the read cycle time for reading the packetized data from the buffer memory 5111 and the write cycle time for writing the packetized data into the buffer memory 5112 can be reduced.

By granting permission for access to the buffer memories 5111 and 5112 to those of the output circuits 5131 to 5133 and the input circuits 5141 to 5143 in which the transfer request occurs, as described above, it is possible to asynchronously transfer data and hence increase the transfer rate.

In the unit packet switches 5101 to 5106 packetized data is expanded to a parallel form for writing into and reading out of the buffer memories 5111 and 5112 so as to increase the equivalent operation speeds of these memories. For instance, packetized data read out in parallel from the buffer memory 5111 of the unit packet switch 5101 is transformed into a serial form in the output circuits 5131 to 5133, from which it is supplied to the links 31 to 33. The serial packetized data having arrived at the input circuit 5141 of the unit packet switch 5104 is transformed into a parallel form in the input circuit 5141 and is then written into the buffer memory 5112.

Figure 13:
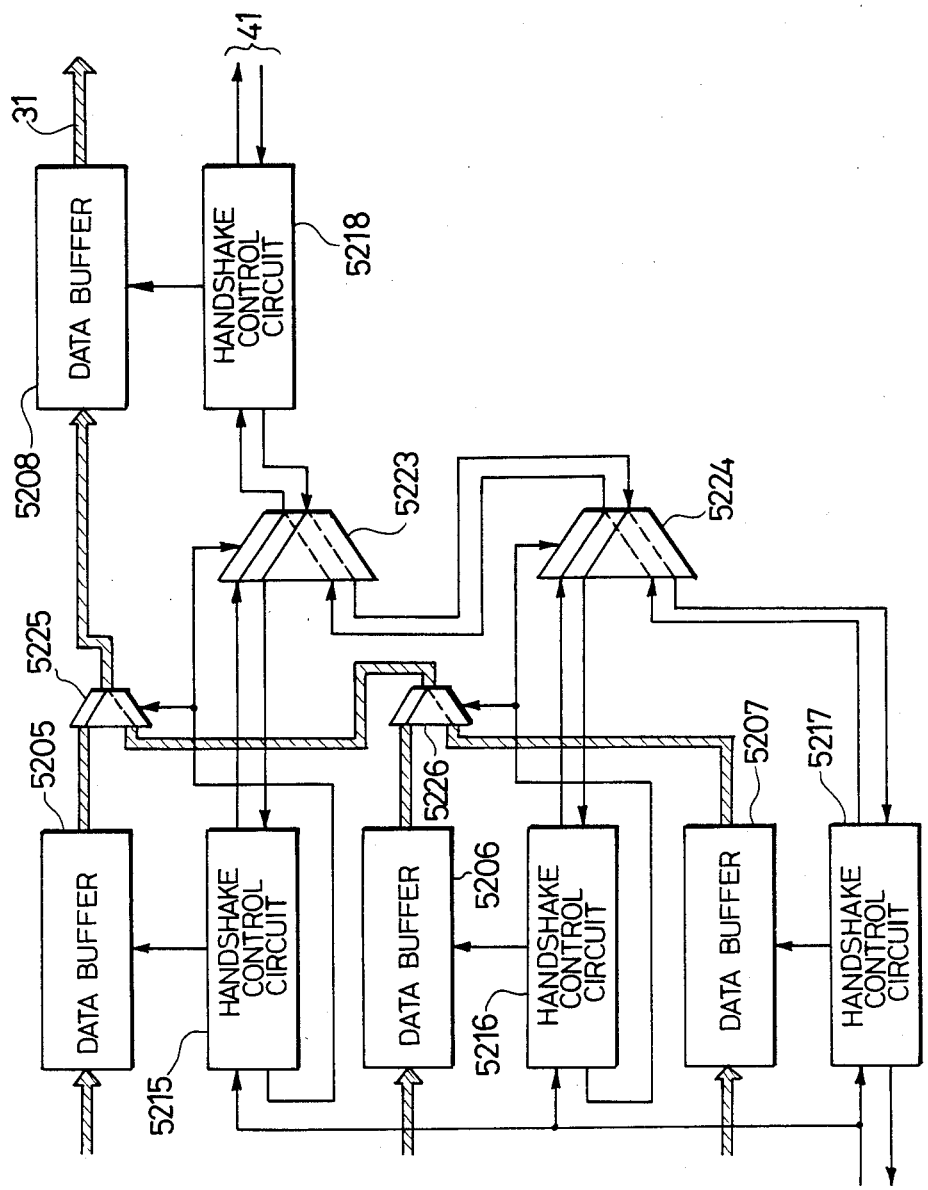
FIG. 13 is a block diagram showing the arrangement of a parallel-to-serial transform circuit provided in an output circuit.
Figure 14:
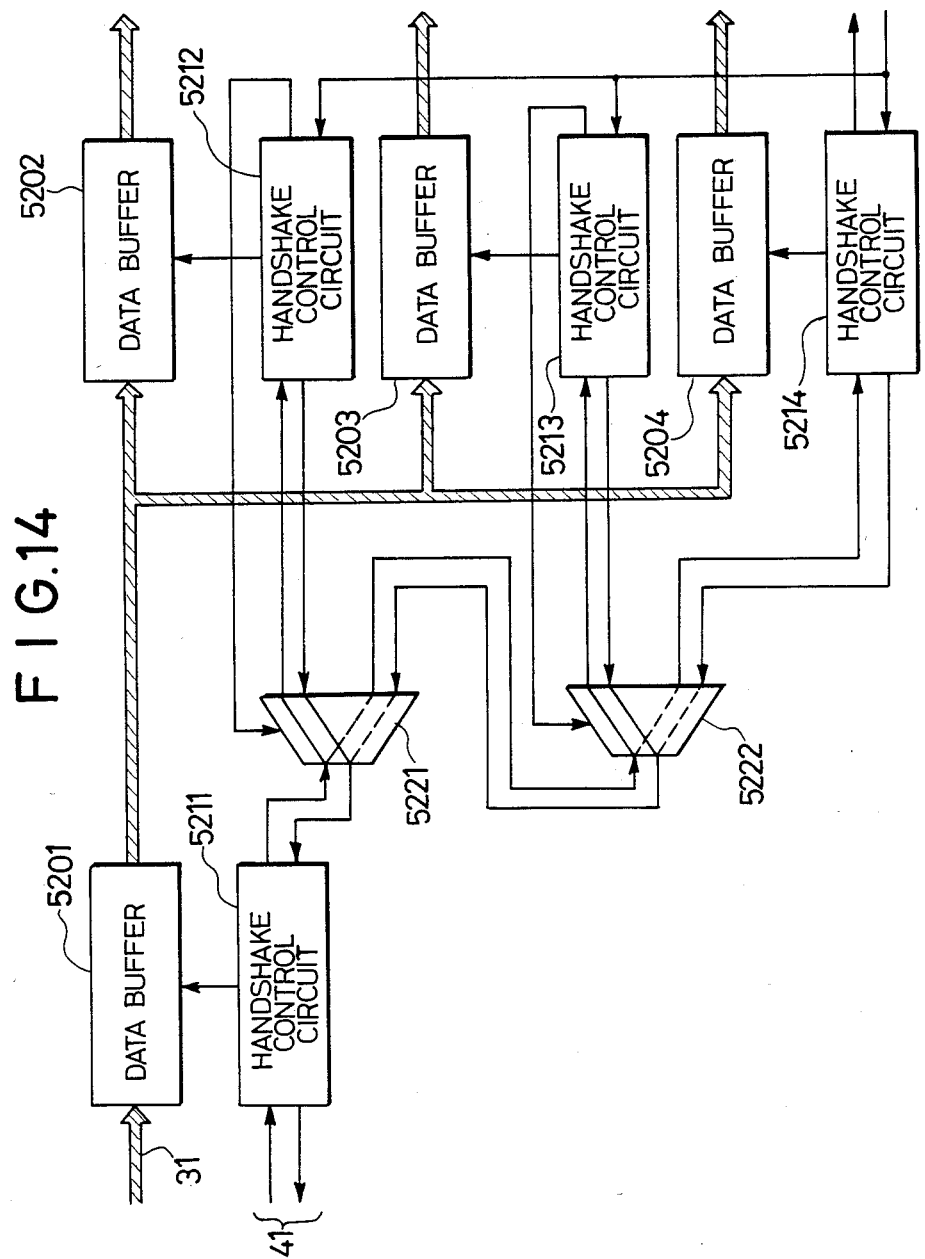
FIG. 14 is a block diagram showing the arrangement of a serial-to-parallel transform circuit provided in an input circuit.

FIGS. 13 and 14 are block diagrams showing the circuit arrangements for performing the parallel-to-serial and serial-to-parallel transformations, respectively.

FIG. 13 illustrates a parallel-to-serial transform circuits for transforming 3-bit parallel data read out of the buffer memory 5111 into serial data. This circuit forms a part of the output circuit 5131.

The parallel-to-serial transform circuit performs the following operations:

(1) Parallel data, when supplied to the output this circuit, is latched in data buffers 5205 to 5207 under control of handshake control circuits 5215 to 5217.

(2) When the parallel data is thus latched, the handshake control circuits 5215 and 5216 switch each of selectors 5223 to 5226 to the solid line side, by which the data buffers 5205 and 5208 are interconnected and the handshake control circuits 5215 and 5218 are interconnected.

(3) The handshake control circuit 5218 responds to control information from the handshake control circuit 5215 to transfer the data from the data buffer 5205 to the data buffer 5208.

(4) The handshake control circuit 5218 sends data out of the data buffer 5208 to the link 31.

(5) The handshake control circuit 5215 switches each of the selectors 5223 and 5225 to the broken line side, by which the data bufferes 5206 and 5208 are interconnected and the handshake control circuits 5216 and 5218 are interconnected.

(6) The handshake control circuit 5218 responds to control information from the handshake control circuit 5216 to transfer the data from the data buffer 5206 to the data buffer 5208.

(7) The handshake control circuit 5218 sends the data out of the data buffer 5208 to the link 31.

(8) The handshake control circuit 5216 switches each of the selectors 5224 and 5226 to the broken line side, connecting the data buffer 5207 to the data buffer 5208 and the handshake control circuit 5217 to the handshake control circuit 5218.

(9) The handshake control circuit 5218 responds to control information from the handshake control circuit 5217 to transfer the data from the data buffer 5207 to the data buffer 5208. The handshake control circuit 5217 indicates to the select control circuit 5121 that the output circuit is ready for receiving the next parallel data.

(10) The data in the data buffer 5208 is provided on the link 31.

The parallel-to-serial transform circuit repeats the above operations, thereby transforming the parallel data into a serial form.

FIG. 14 illustrates a serial-to-parallel transform circuit by which the serial data received from the link 31 is transformed into 3-bit parallel data. This circuit forms a part of the input circuit 5141 shown in FIG. 12.

The serial-to-parallel transform circuit performs the following operations:

(1) When the first-bit data arrives at the input circuit, the data is latched in a data buffer 5201 under control of a handshake control circuit 5211.

(2) The handshake control circuit 5211 indicates via a selector 5221 to a handshake control circuit 5212 that the data has been latched in the data buffer 5201.

(3) The handshake control circuit 5212 responds to control information from the handshake control circuit 5211 to transfer the latched data from the data buffer 5201 to a data buffer 5202.

(4) The handshake control circuit 5212 switches the selector 5221 to the broken line side, thereby connecting the handshake control circuit 5211 to another handshake control circuit 5213.

(5) Second-bit data latched in the data buffer 5201 is transferred to another data buffer 5203 in response to control information which is sent to the handshake control circuit 5213 via the route: handshake control circuit 5211→selector 5221→selector 5222→handshake control circuit 52131.

(6) The handshake control circuit 5213 switches the selector 5222 to the broken line side, thereby connecting the handshake control circuit 5211 to another handshake control circuit 5214.

(7) Third-bit data latched in the data buffer 5201 is transferred to another data buffer 5204 under control of the handshake control circuit 5214.

(8) Following this, the handshake control circuit 5214 indicates to the select control circuit 5122 that the input circuit is ready for sending out the parallel data.

(9) Upon transfer of the parallel data, the handshake control circuits 5212 to 5214 are reset. The above-described operations are repeated, by which the serial-to-parallel transformation is executed.

Let it be assumed, in the fourth embodiment, that the transfer rate of each of the incoming trunks 11 to 13 and the sum of the write and read rates of the buffer memories 5111 and 5112 are V and 3 V, respectively, and that the destinations of packetized data from the incoming trunks 11 to 13 have been localized on the outgoing trunks 21 to 23 for a while.

In the case where data stored in the buffer memory 5111 of the unit packet switch 5101 is only packetized data to be sent via the link 31 to the unit packet switch 5104, no data need be sent to the links 32 and 33; and so that the output circuit 5131 can occupy the buffer memory 5111 and needs only to read out therefrom the data to be delivered to the link 31. Accordingly, the data can be transferred to the unit packet switch 5104 at a rate up to 3 V. As a result of this, there will be caused no internal packet loss in the switching network due to the transfer rate V of each link.

On the other hand, when there is stored in the buffer memory 5111 of the unit packet switch 5101 the packetized data that is to be transferred therefrom via the links 31, 32 and 33 to the unit packet switches 5104, 5105 and 5106, the links 31, 32 and 33 can transfer the data at the same rate, i.e. at the rate V equivalently. That is to say, it is possible to achieve exactly the same transfer as in the case where the unit packet switches are interconnected via links of the fixed rate V.

The above applies to the write of data into the buffer memory 5112; namely, data received from only one link is written at a high speed and data from a plurality of links is written at a low speed.

By performing the data transfer between the stages of unit packet switches through utilization of the handshaking technique as described above, the capacity of each packetized data transfer link between the stages undergoes a dynamic change within a range in which the sum of transfer rates of the links accommodated in each unit packet switch remains below the operation speed of the buffer memory in the unit packet switch. This will increase the throughput of the packet switch 5000 and make it possible to cope flexibly with traffic variations of packetized data.

While in the above the packet switch has been described to be formed by two stages of unit packet switches each of which accommodates three trunks and three links, the same effects as those noted above will be obtainable even if the numbers of trunks and links accommodated in each unit packet switch are changed and the number of stages is changed. The transform circuits shown in FIGS. 13 and 14 are circuits for transformation between serial data and parallel data with bits the number of which is three times larger than the serial data, but similar transform circuits can easily be obtained regardless of the bit-number ratio between serial and parallel data.

Figure 15:
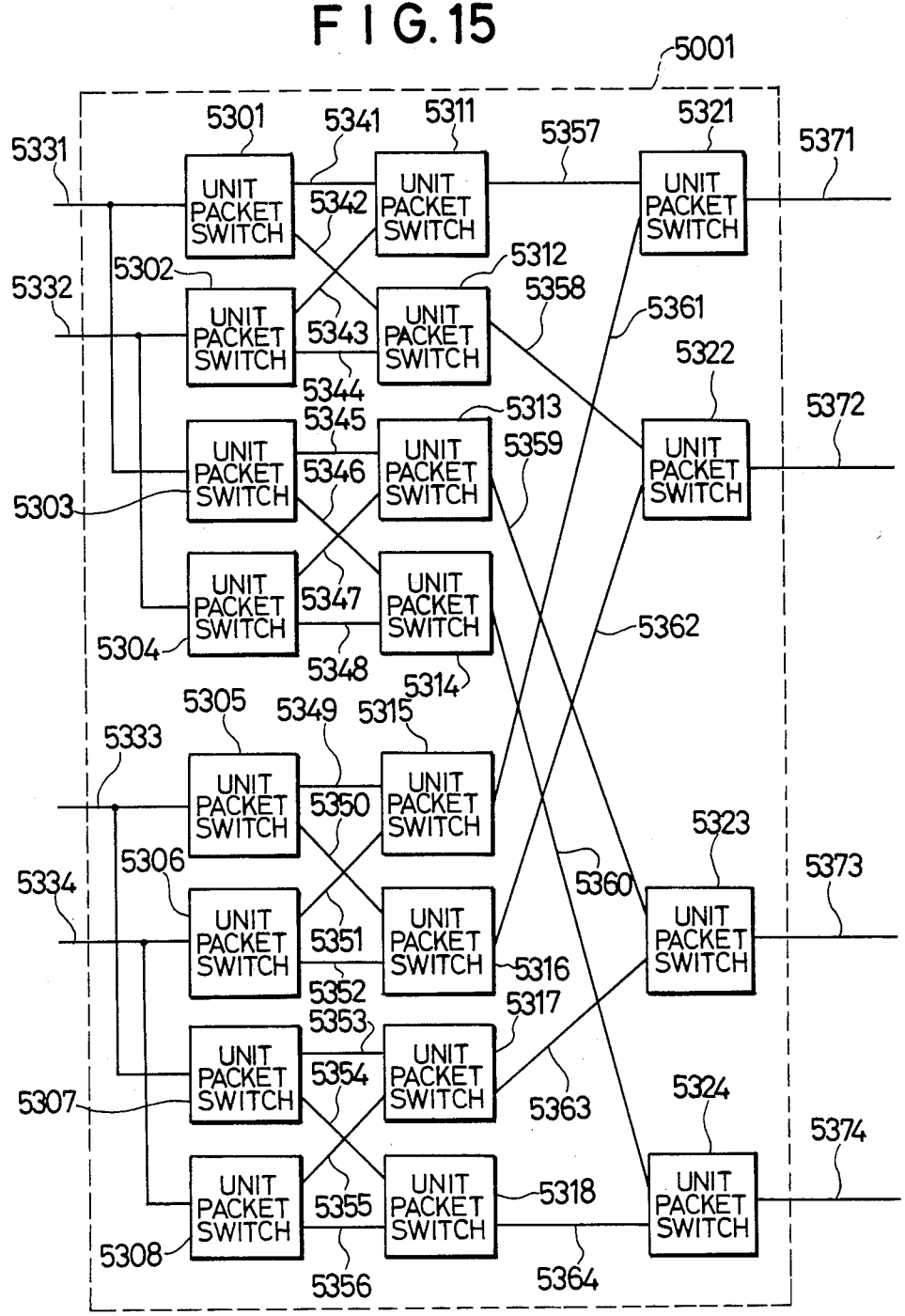
FIG. 15 is a block diagram illustrating the arrangement of a fifth embodiment of the present invention.

FIG. 15 illustrates in block form the arrangement of a fifth embodiment of the present invention. This embodiment is a packet switch which includes three stages of unit packet switches, which are identical in construction with the packet switch of the third embodiment shown in FIG. 9. In FIG. 15 reference numerals 5331 to 5334 indicate incoming trunks, 5301 to 5308 first-stage unit packet switches, 5311 to 5318 second-stage unit packet switches, 5321 to 5324 third-stage unit packet switches, 5001 a packet switch comprising the three stages of unit packet switches, 5341 to 5356 links between the first and second stages, and 5357 to 5364 links between the second and third stages. The inter-stage links 5341 to 5364 each perform a data transfer utilizing the handshaking technique.

The incoming trunks 5331 to 5334 are each accommodated in two first-stage unit packet switches. For instance, the incoming trunk 5331 is accommodated in the unit packet switches 5301 and 5303. Only data which is sent from the incoming trunk 5331 to outgoing trunks 5371 and 5372 is stored in the buffer memory of the unit packet switch 5301, and data to be sent to outgoing trunks 5373 and 5374 is stored in the buffer memory of the unit packet switch 5303.

The data transfer from the first-stage unit packet switches 5301 to 5308 to the second-stage unit packet switches 5311 to 5318 and the data transfer from the second-stage unit packet switches 5311 to 5318 to the third-stage unit packet switches 5321 to 5324 are performed using the handshaking technique as in the fourth embodiment. The transferred data is provided on the outgoing trunks 5371 to 5374 from the buffer memories of the third-stage unit packet switches 5321 to 5324.

Also in this arrangement, the rate of each link varies dynamically with imbalanced traffic within a range in which the sum of the rates of each pair of links such as the links 5341 and 5342 accommodated in the first-stage unit packet switch 5301, the links 5341 and 5343 accommodated in the second-stage unit packet switch 5311, or the links 5357 and 5361 accommodated in the third-stage unit packet switch 5321 remains below the operation speed of the buffer memory of each unit packet switch. Accordingly, this embodiment is free from the packet loss in the switching network which is caused by the shortage of the link capacity between the stages of unit packet switches.

In the embodiment depicted in FIG. 15, the first-stage unit packet switches 5301 to 5308 each accommodate one incoming trunk and the third-stage unit packet switches also each accommodate one outgoing trunk; therefore, it is possible to use trunks whose data transfer rate is high accordingly.

As described above, the packet switch of the present invention, which is formed by a single unit packet switch, is so arranged as to bring data from a plurality of trunks into and out of one memory. Accordingly, a large-capacity packet switch can be obtained economically.

Furthermore, the provision of FIFOs in input and output circuits will permit packet switching between trunks of different data transfer rates.

Moreover, since arbiters are provided for detecting process requests from the input circuits and the output circuits, respectively, access to the memory can be allocated dynamically to them. This will not only enable packet switching between trunks of different data transfer rates but also permit efficient access to the memory.

Besides, the packet switch of the present invention, which has a multi-stage structure including a plurality of unit packet switches interconnected by links between respective stages, utilizes the handshaking technique for the data transfer by the links so that their data transfer rate is changed dynamically with imbalanced traffic. This packet switch possesses the following advantages:

(1) Since the operation speed of the buffer memory which forms the principal part of the packet switch can be utilized to the utmost, the throughput of the packet switch can be increased.

(2) Since the data transfer rate of each link can be changed flexibly with a change in traffic, the packet switch of low packet loss and small delay time can be realized with a small amount of hardware.

It will be apparent that many modifications and variations may be effected without departing from the scope of the novel concepts of the present invention.

What is claimed is:

1. A packet switch with variable data transfer rate links, which forms a packet switching network of a packet switching system, comprising:
a multi-stage structure including a plurality of unit packet switches, each of said unit packet switches including:
connections for a plurality of incoming trunks;
a plurality of input circuits connected to said connections for the plurality of incoming trunks, respectively, and each having a FIFO memory;
connections for a plurality of outgoing trunks;
a plurality of output circuits connected to said connections for the plurality of outgoing trunks, respectively, and each having a FIFO memory;
a buffer memory which is used in common for the incoming trunks and the outgoing trunks, by writing data received from the incoming trunks and reading it out for transfer to the outgoing trunks, the FIFO memory of each of the input circuits for temporarily storing the received data from the corresponding incoming trunk, the FIFO memory of each of the output circuits for temporarily storing the data to be sent to the corresponding outgoing trunk;
first signal lines, respectively connected to said input circuits, for providing information indicating the arrival of data at the corresponding input circuit from the incoming trunk connected thereto;

a first arbiter, connected to said first signal lines, for detecting data-process requests from said input circuits on the basis of the information provided on said first signal lines and for effecting priority control for servicing the requests;

second signal lines, respectively connected to said output circuits, for providing information indicating whether or not data transfer to the corresponding output circuit is possible; and a second arbiter connected to said second signal lines, for detecting data-process requests from said output circuits on the basis of the information provided on said second signal lines and for effecting priority control for servicing the requests;

links interconnecting the respective stages of the unit packet switches, for performing asynchronous packet data transfer by handshaking; and a control circuit for controlling the data transfer by handshaking while dynamically changing the capacity of each of said links within a range in which the sum of data transfer rates of said links accommodated in each unit packet switch is smaller than the operational speed of said buffer memory in said unit packet switch.

2. A packet switch according to claim 1, wherein each of said output circuits includes a parallel to serial transform circuit for transforming parallel data read out from said buffer memory into serial data.

3. A packet switch according to claim 2, wherein each of said input circuits comprises a serial to parallel transform circuit for transforming serial data received from the corresponding link into parallel data.

4. A packet switch coupled to incoming trunks and outgoing trunks, comprising:

a multi-stage structure including a plurality of unit packet switches, each of which includes:

a plurality of input circuits coupled to the plurality of incoming trunks, respectively;

a plurality of output circuits coupled to the plurality of outgoing trunks, respectively;

a buffer memory coupled to said input circuits and to said output circuits, said buffer memory being used in common by the incoming trunks and outgoing trunks by writing data received from the incoming trunks and reading it out for transfer to the outgoing trunks;

links interconnecting the respective stages of the unit packet switches, for performing asynchronous packet data transfer by handshaking; and a control circuit for controlling the data transfer by handshaking while dynamically changing the capacity of each of said links within a range in which the sum of data transfer rates of said links accommodated in each unit packet switch is smaller than the operational speed of said buffer memory in said unit packet switch.

* * * * *